No. 690,585. Patented Jan. 7, 1902.
W. L. JUDSON.
POWER TRANSMISSION DEVICE.
(Application filed Feb. 23, 1901.)
(No Model.) 7 Sheets—Sheet 1.

Witnesses,
Harry Kilgore
C. H. Turner

Inventor:
Whitcomb L. Judson.
By his Attorneys,
Williamson & Merchant

THE NORRIS PETERS CO., PHOTO-LITHO., WASHINGTON, D. C.

No. 690,585. Patented Jan. 7, 1902.
W. L. JUDSON.
POWER TRANSMISSION DEVICE.
(Application filed Feb. 23, 1901.)
(No Model.) 7 Sheets—Sheet 2.

No. 690,585. Patented Jan. 7, 1902.
W. L. JUDSON.
POWER TRANSMISSION DEVICE.
(Application filed Feb. 23, 1901.)
(No Model.) 7 Sheets—Sheet 3.

Witnesses.
Harry Kilgore
C. H. Turner

Inventor,
Whitcomb L. Judson,
By his Attorneys,
Williamson & Merchant

No. 690,585. Patented Jan. 7, 1902.
W. L. JUDSON.
POWER TRANSMISSION DEVICE.
(Application filed Feb. 23, 1901.)
(No Model.) 7 Sheets—Sheet 4.
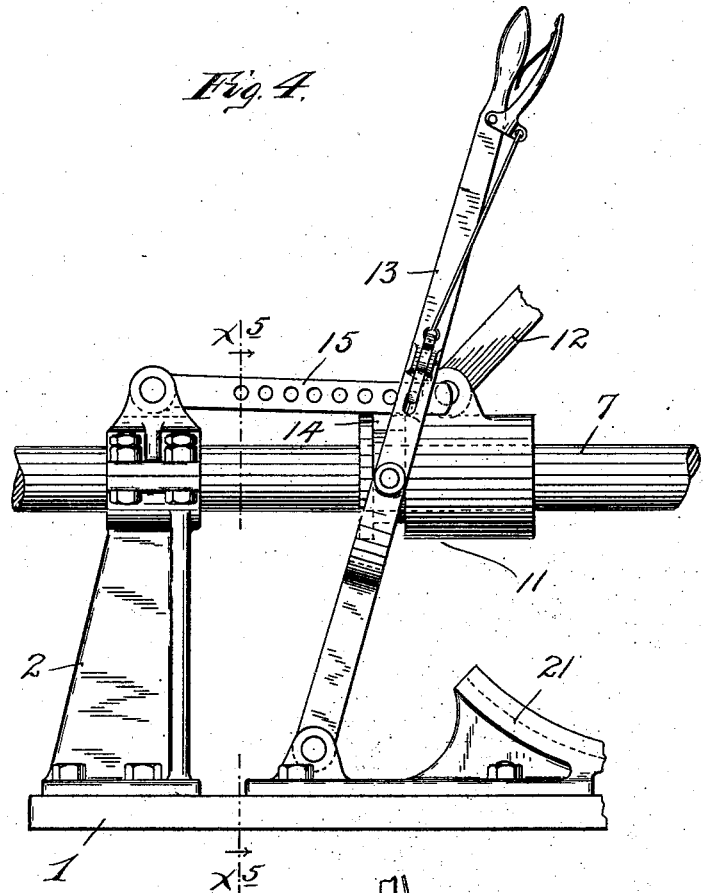
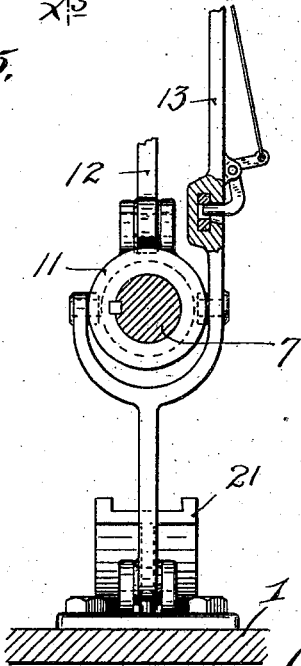
Witnesses,
Harry Kilgore,
C. H. Turner.
Inventor,
Whitcomb L. Judson
By his Attorneys,
Williamson Merchant No. 690,585. Patented Jan. 7, 1902.
W. L. JUDSON.
POWER TRANSMISSION DEVICE.
(Application filed Feb. 23, 1901.)

(No Model.) 7 Sheets—Sheet 5.

Witnesses.
Harry Kilgore
C. H. Turner

Inventor.
Whitcomb L. Judson,
By his Attorneys,
Williamson & Merchant

No. 690,585. Patented Jan. 7, 1902.
W. L. JUDSON.
POWER TRANSMISSION DEVICE.
(Application filed Feb. 23, 1901.)
(No Model.) 7 Sheets—Sheet 6.
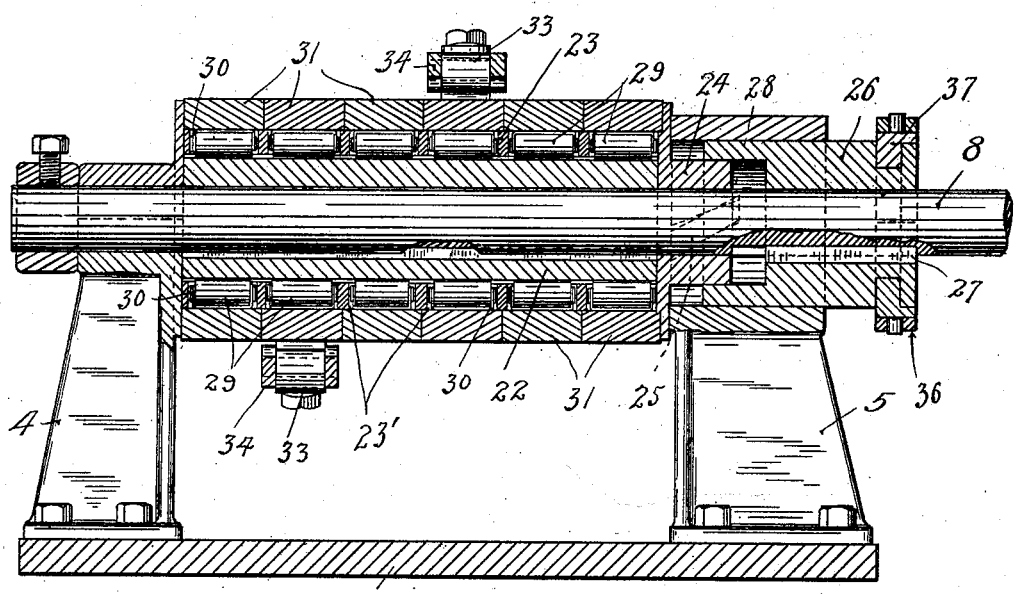
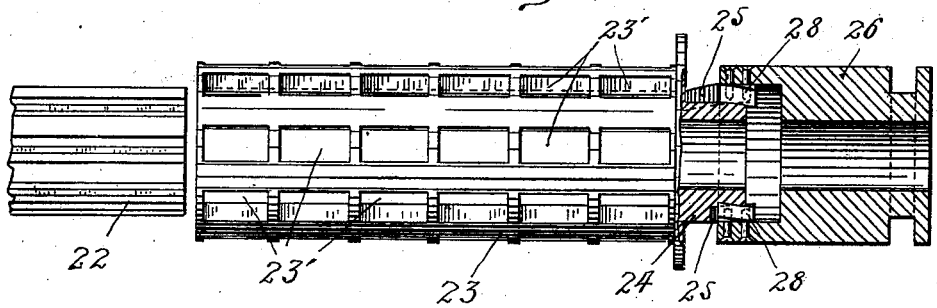
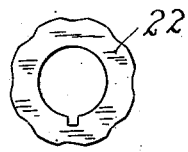
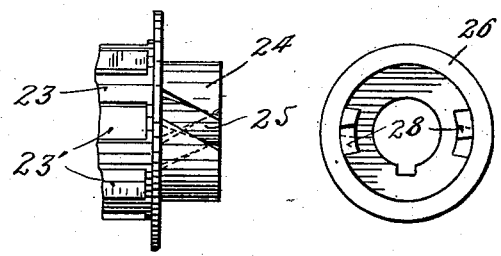
Witnesses,
Harry Kilgore
C. H. Turner
Inventor:
Whitcomb L. Judson
By his Attorneys,
Williamson & Merchant
THE NORRIS PETERS CO., PHOTO-LITHO., WASHINGTON, D. C.

No. 690,585. Patented Jan. 7, 1902.
W. L. JUDSON.
POWER TRANSMISSION DEVICE.
(Application filed Feb. 23, 1901.)
(No Model.) 7 Sheets—Sheet 7.

Witnesses,
Harry Kilgore.
C. H. Turner.

Inventor:
Whitcomb L. Judson,
By his Attorneys,
Williamson & Merchant.

UNITED STATES PATENT OFFICE.

WHITCOMB L. JUDSON, OF CHICAGO, ILLINOIS.

POWER-TRANSMISSION DEVICE.

SPECIFICATION forming part of Letters Patent No. 690,585, dated January 7, 1902.

Application filed February 23, 1901. Serial No. 48,413. (No model.)

*To all whom it may concern:*

Be it known that I, WHITCOMB L. JUDSON, a citizen of the United States, residing at Chicago, in the county of Cook and State of Illinois, have invented certain new and useful Improvements in Power-Transmission Devices; and I do hereby declare the following to be a full, clear, and exact description of the invention, such as will enable others skilled in the art to which it appertains to make and use the same.

My present invention relates generally to variable-speed power-transmission mechanism, and has for its especial object to provide an improved variable-speed drive for automobiles and other comparatively light vehicles.

To the above ends the invention consists of the novel devices and combinations of devices hereinafter described, and defined in the claims.

The invention is illustrated in the accompanying drawings, wherein like characters indicate like parts throughout the several views.

Figure 1:
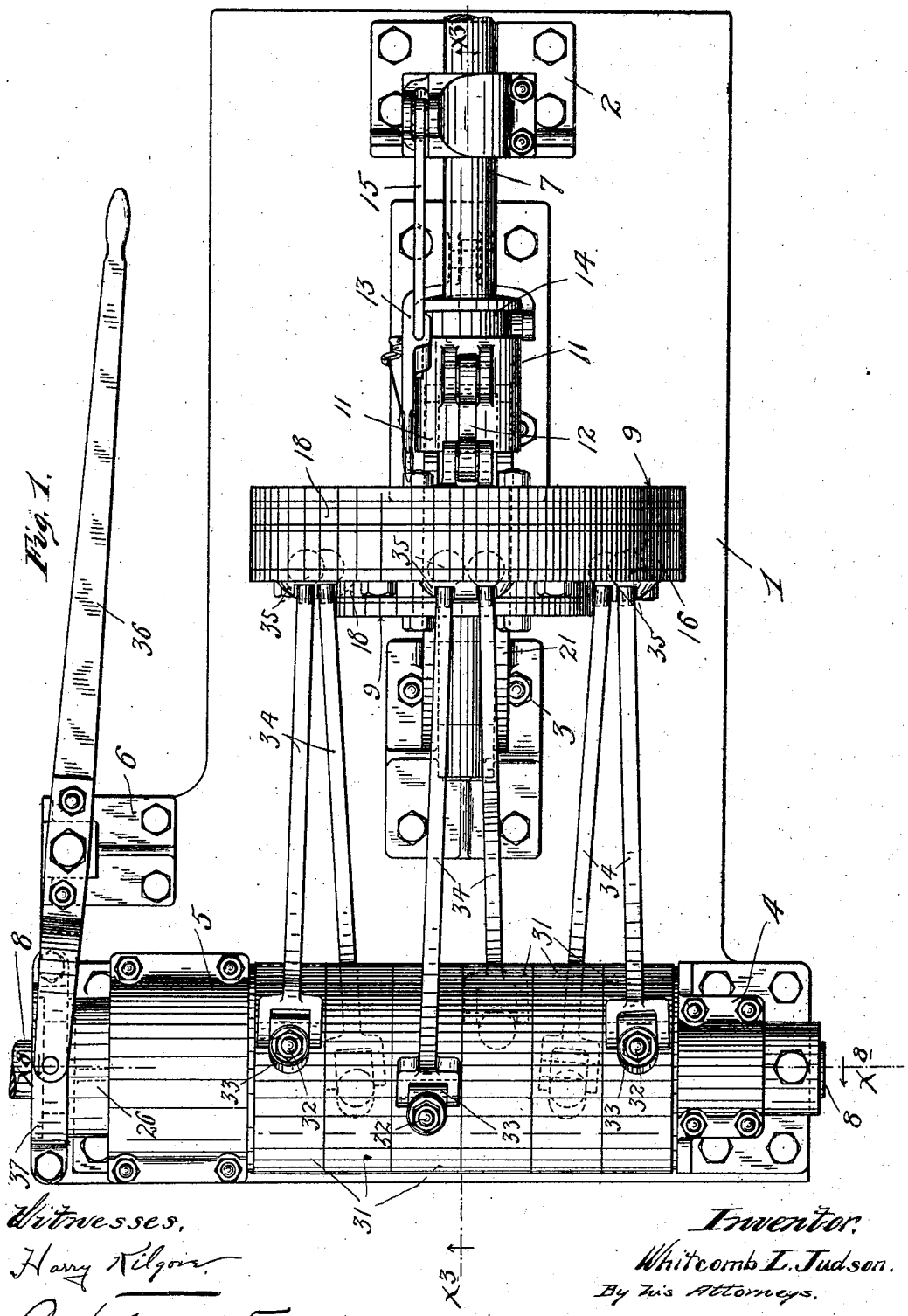
Figure 2:
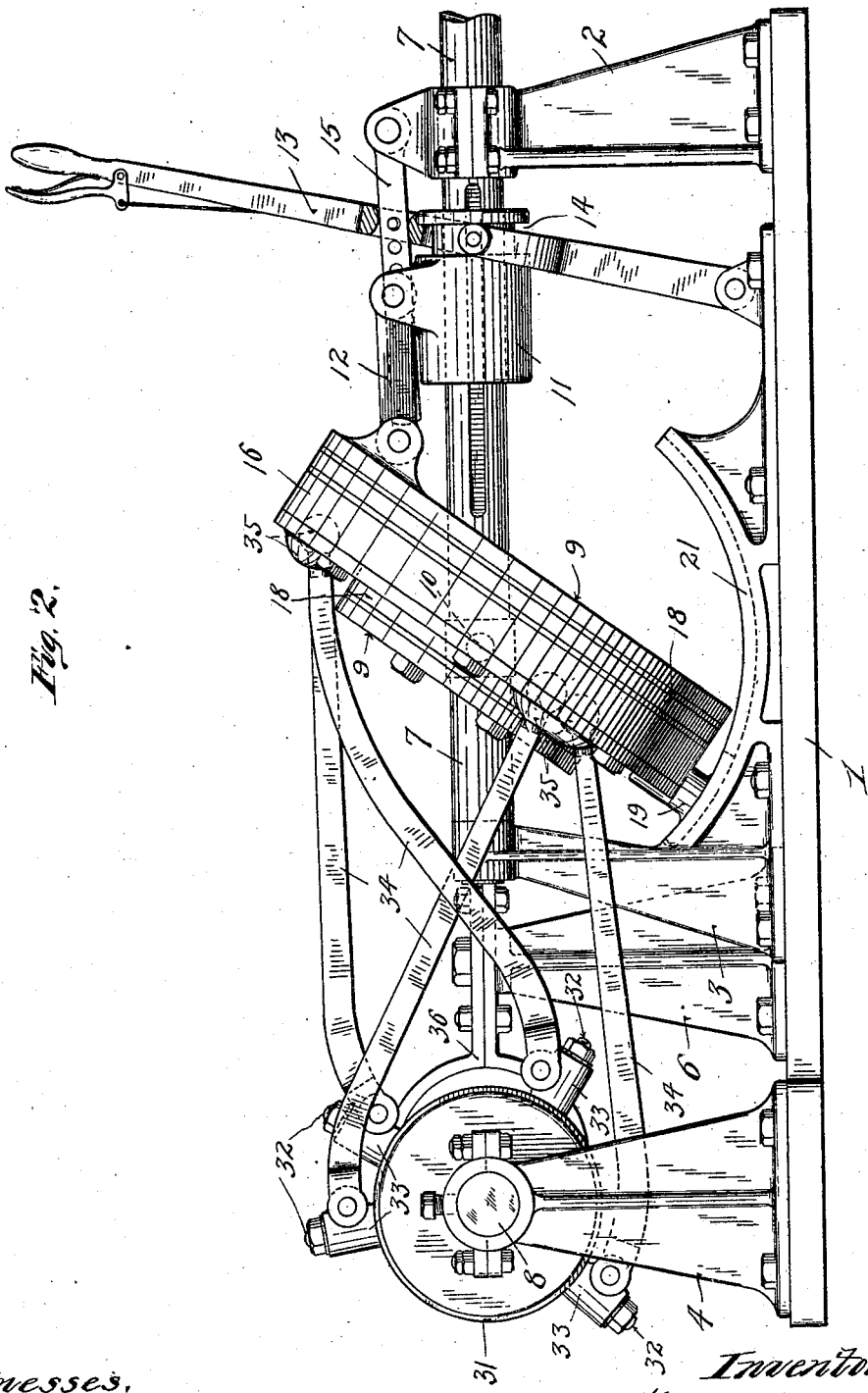
Figure 3:
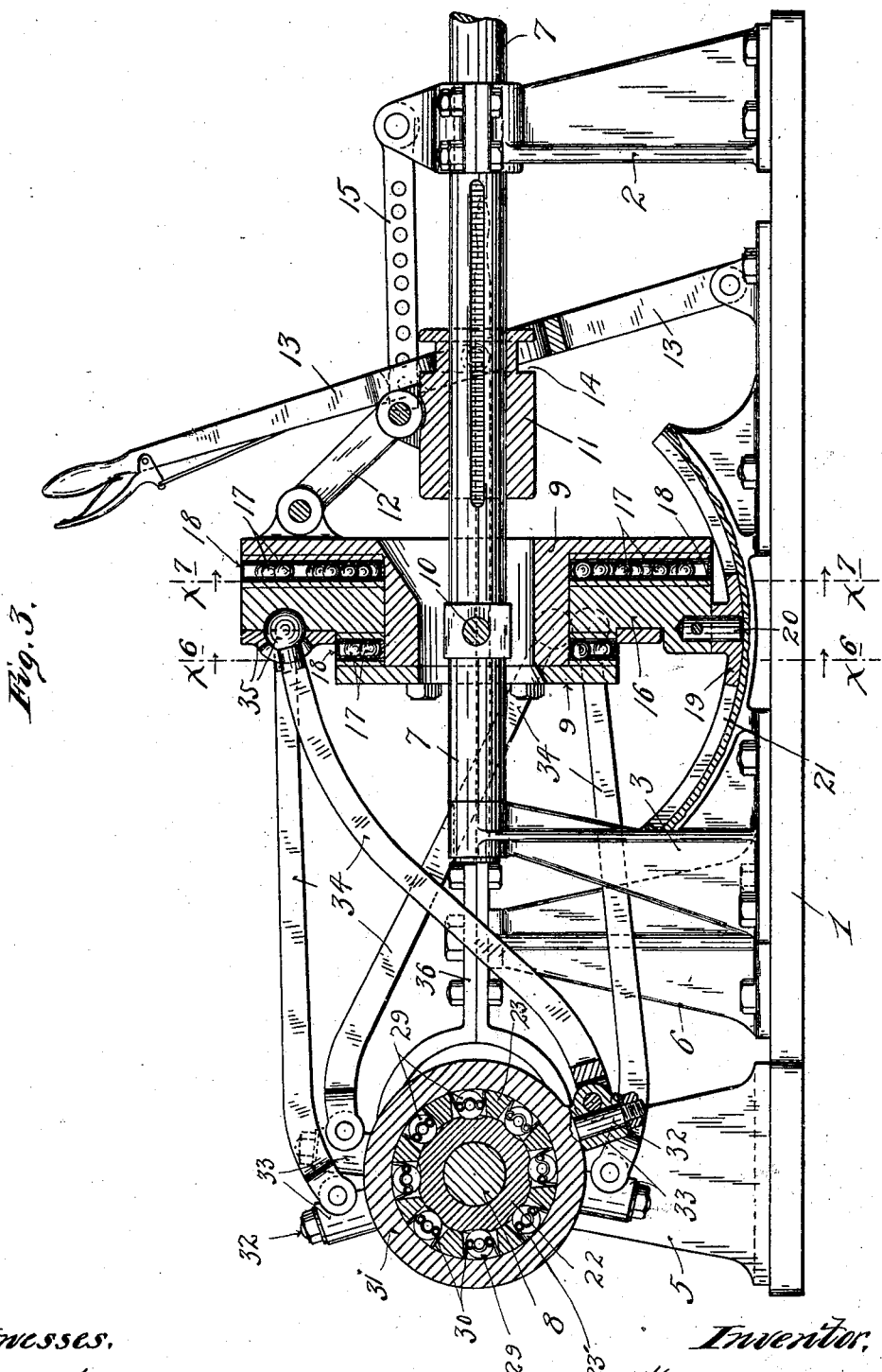
Figure 6:
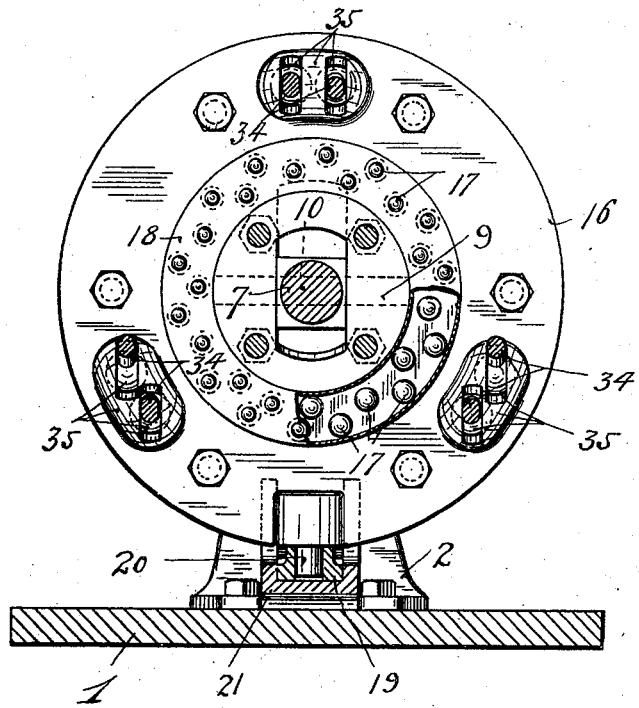
Figure 7:
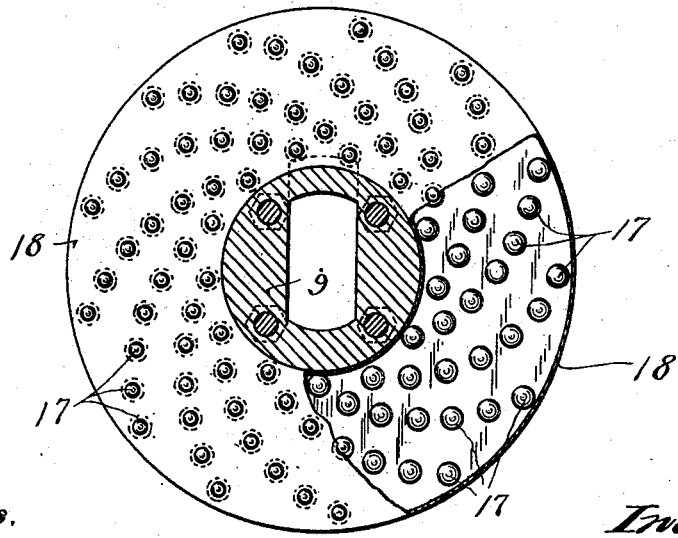
Figure 13:
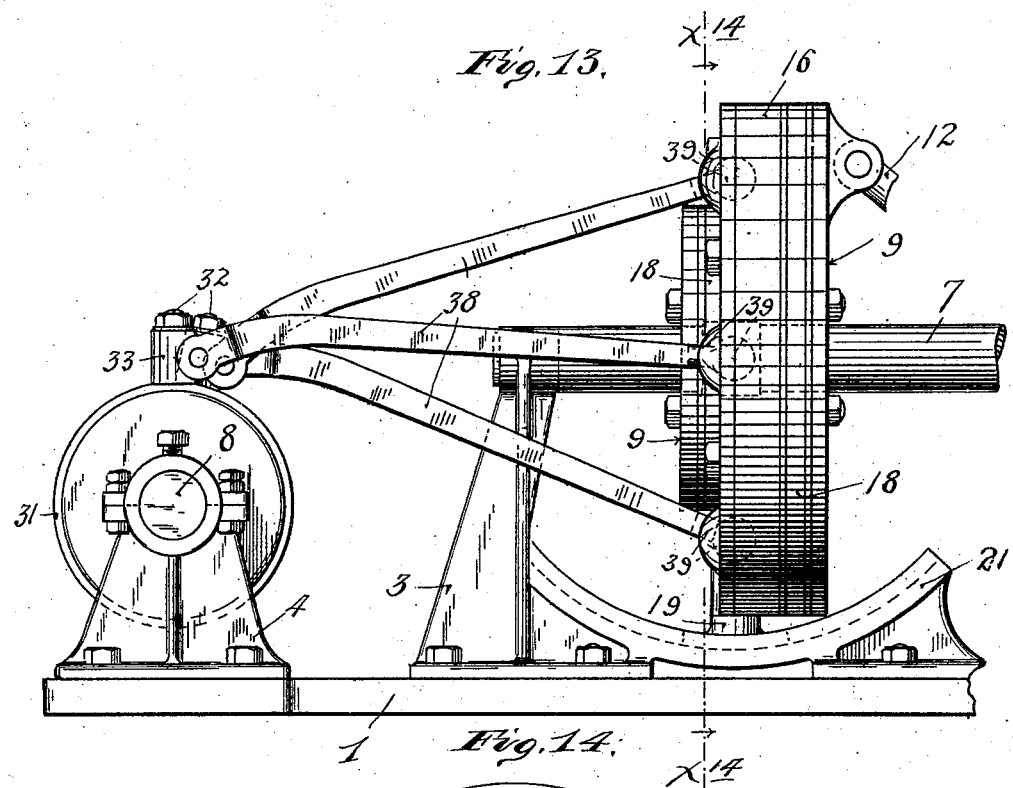
Figure 14:
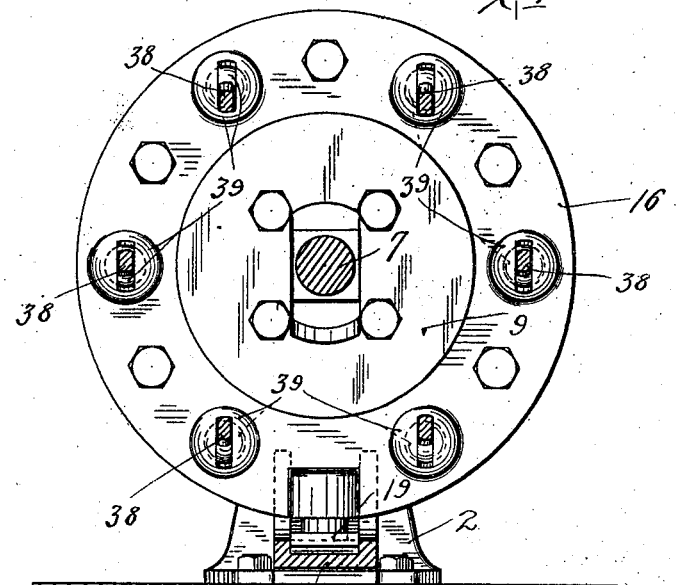

Figure 1 is a plan view of a power-transmission device constructed in accordance with my invention. Fig. 2 is a side elevation of the device shown in Fig. 1, showing the thrust-ring and the thrust-disk in different positions. Fig. 3 is a vertical section taken approximately on the line $x^3 x^3$ of Fig. 1, some parts being shown in full. Fig. 4 is a detail of the connections for adjusting the so-called "rotary thrust-disk." Fig. 5 is a vertical section approximately on the line $x^5 x^5$ of Fig. 4, some parts being broken away. Fig. 6 is a transverse vertical section on the line $x^6 x^6$ of Fig. 3, some parts being broken away. Fig. 7 is a transverse vertical section taken on the line $x^7 x^7$ of Fig. 3, some parts being broken away and others being removed. Fig. 8 is a transverse vertical section on the line $x^8 x^8$ of Fig. 1. Fig. 9 is a detail view, partly in side elevation and partly in vertical section, showing the principal parts of the clutch mechanism, said parts being drawn apart. Fig. 10 is an end elevation of the so-called "clutch-sleeve." Fig. 11 is a plan view of a portion of the so-called "clutch-reversing cage." Fig. 12 is an end elevation of the so-called "clutch-reversing hub." Fig. 13 is a view in side elevation, illustrating a slightly-modified construction of the device illustrated in Figs. 1 to 12, inclusive; and Fig. 14 is a transverse vertical section on the line $x^{14} x^{14}$ of Fig. 13.

The numeral 1 indicates a bed-plate which, as shown, is provided with bearing-pedestals 2, 3, 4, 5, and 6. A constantly-running driving-shaft 7 is journaled in the pedestals 2 and 3 and is fixed against endwise movement therein. A driven shaft 8 is mounted in the pedestals 4 and 5, its mounting in the said pedestal 5 being indirect, as will hereinafter appear. The driving-shaft 7 carries a crank, which in its preferred form is in the nature of an annular head (hereinafter called the "thrust-disk") formed with a peripheral channel or annular seat. This thrust-disk 9 is connected to the bearing-shaft 7 for rotation therewith by means of a diametrically-extended pin or bolt 10, which permits the said thrust-disk to be adjusted or set in a plane at a right angle to the axis of the driving-shaft, as shown in Figs. 1 and 3, or to be moved and set in an extreme oblique angle with respect thereto, as shown in Fig. 2.

To adjust the rotary thrust-disk and set the same to run in either of its extreme positions or in intermediate positions, a hub 11 is keyed to slide on, but to rotate with, the driving-shaft 7, and this hub is, as shown, connected to the crank-head by means of a link 12. A shipper-lever 13, which, as shown, is pronged at its intermediate portion and is pivotally connected at its lower end to the bed-plate 1, engages with an annular groove 14 of the hub 11 and affords means whereby the said hub may be moved axially and the rotary thrust-disk adjusted while the parts are in motion. An ordinary latch-bar 15, which, as shown, is perforated and is pivoted to the pedestal 2, coöperates with the latch-lever 13 to hold the sliding hub 11 and crank-head 9 in their set adjustments.

A thrust-ring 16 is loosely mounted in the peripheral annular channel of the thrust-disk 9, and, as shown, bearing-balls 17, suitably spaced by retaining-plates 18, are placed between the sides of said thrust-ring and the embracing flanges of said thrust-disk. This thrust-ring 16 is provided at its lower portion with a cross-head 19, which is preferably pivoted on a pin 20, projecting therefrom. This cross-head 19 works freely in the segmental channel of a cross-head guide 21, which, as shown, is formed integral with the pedestal 3 and is rigidly secured to the bed-plate 1. The cross-head 19 and guide 21 coöperate to prevent rotation of the thrust-ring 16, but permit the same to wabble under the action of the thrust-disk 9.

The driven shaft 8 is acted upon by clutch mechanism, which in turn is driven, through suitable connections, from the thrust-ring 16. The clutch mechanism herein illustrated is very similar to that set forth and claimed in my pending application, Serial No. 33,044, filed October 15, 1900, entitled "Reversible clutch." Hence the said clutch in itself is not herein claimed, and it will be understood that other clutch devices may be substituted therefor. The said clutch, briefly described, comprises as follows, attention being particularly called to Figs. 3, 8, 9, 10, 11, and 12. The numeral 22 indicates a grooved or fluted sleeve, which is keyed to the driven shaft 8 between the pedestals 4 5. So-called "reversing-cage" 23, which is shown as in the form of a sleeve having a series of rectangular roller-seats 23', is loosely mounted on the fluted clutch-sleeve 22. As shown, the said reversing-cage 23 is provided at its right-hand end, as viewed in Figs. 8, 9, and 11, with a flanged hub 24, in which, at diametrically opposite points, short spiral grooves or cam-channels 25 are cut. The pedestal 5, surrounding the shaft 8, is provided with a large cylindrical bore in which a so-called "clutch-reversing hub" 26 is mounted to rotate and to slide. This hub is caused to rotate with the shaft 8, but is free to slide thereon, this, as shown, being accomplished by a key 27. The inner end of the hub 26 is recessed to form a seat for the hub 24 of the reversing-cage 23 and is provided with spiral keys 28, which work in the said grooves 25. In each pocket 23' of the reversing-cage 23 is a clutch-roller 29, the ends of which, as shown, are reduced and are engaged by spacing-springs 30, that tend to hold them central of the said pockets. As shown, there are six series of these rollers 29, and around each series, mounted on the cage 23, is an oscillating driving-ring 31. The six clutch-rings 31 are arranged to operate in pairs, and each, as shown, is provided with a radially-projecting wrist-pin 32, on which is swiveled a block 33. To each block 33 is pivoted the outer end of a rod or pitman 34, the inner end of which is connected to the peripheral portion of the thrust-ring 16 by means of a ball-and-socket joint 35.

In the arrangement illustrated in Figs. 1 to 12, inclusive, the wrist-pins 32 of the clutch-rings 31, which work in pairs, project in opposite directions—that is, as shown, one up and the other down—and the rods 34 which actuate them are connected to the thrust-ring 16 as nearly as is convenient to the same point.

The clutch-reversing hub 26 may be moved endwise by means of a lever 36, pivoted to the pedestal 6 and connected to said hub 26 by a coupling-ring 37, which works in an annular groove of said hub.

Operation: It is of course evident that when the thrust-disk 9 is adjusted into a plane intersecting the axis of the driving-shaft 7 at a perpendicular or right angle, as shown in Figs. 1 and 3, it will revolve freely without imparting any motion whatever to the thrust-ring 16. It is also obvious that when the said thrust-disk is set at an oblique angle to the axis of the driving-shaft 7, as indicated in Fig. 2, for instance, the rotation thereof with the said driving-shaft will cause the non-rotary thrust-ring 16 to vibrate back and forth with a peculiar wabbling or gyrating action in which one peripheral point after the other of the said thrust-rings will be successively thrown to an extreme position in a given direction. Of course the amount of movement given to the clutch-actuating rods or pitmen 34 under this peculiar movement increases and decreases with the angle at which the said thrust-disk is set with respect to a perpendicular to the axis of the shaft 7. Hence it is evident that any desired speed between zero and the maximum possible speed may be secured by the proper adjustments of the said thrust-disk 9. When the reversing-lever 36, reversing-hub 26, and reversing-cage 23 are adjusted to intermediate positions, the rollers 29 will stand at the bottoms of the channels of the fluted clutch-sleeve 22, and no motion whatever will be imparted through the clutches to the driven shaft 8. When, however, by the movements of the lever 36 reversing-hub 26 is moved endwise in either direction, the camming action between the cam-grooves 25 and flanges 28, already described, will cause the reversing-cage 23 to rotate in the one direction or the other with respect to the driven shaft 8 and will thereby simultaneously throw all of the clutch-rollers 29 into operative positions. In this way the several clutches may be simultaneously reversed, and regardless of the direction of rotation of the driving-shaft 7 and thrust-disk 9 the driven shaft 8 may be driven in either direction at will. Under the wabbling movements of the thrust-ring 16 an adjacent pair of the clutch-rings 31 will be given their operative movements in reverse order. Furthermore, the several pairs of rings 31 are reversed in succession and receive their maximum speed of travel in succession, so that the particular ring 31 which is moving in the right direction and with the greatest speed is the one which at the particular instant is driving the said shaft 8. In this way from the obliquely-set thrust-disk a continuous and even driving motion is imparted to the driven shaft.

The construction illustrated in Figs. 13 and 14 is the same as that already described except that the wrist-pins 32 of the clutch-rings 31 all project upward, and their blocks 33 are connected by links or pitmen 38, the coöperating pairs of which are connected by balland-socket joints 39, located on the thrust-ring 16 at diametrically opposite points. In this way the adjacent members of the pairs of clutch-rings are given their operative or driving movements in reverse order, the same as in the arrangement before described.

The so-called "thrust-disk" may of course take various forms and may be connected to its shaft in many different ways. It will also be understood that the intermediate connections between the obliquely-adjustable or obliquely-set rotary thrust-disk and the clutch mechanism may take various forms.

Again, from a broad point of view, the clutch mechanism may be of any suitable form. For some purposes a single clutch would be sufficient, and in some cases, also, a simple pawl-and-ratchet clutch would do the work required. Hence it will be understood that the expression "clutch" is used in the claims in a very broad sense to include all of such devices. For other purposes, however, clutch mechanism of the character specifically described is of the utmost importance. It will be further understood that the expressions "driving-shaft" and "driven shaft" are used in a generic sense and that these shafts might take any suitable form. The driving-shaft instead of being given a continuous rotary movement might be oscillated back and forth, although this of course would not be the best construction.

The device above described is especially well adapted for use as a variable-speed power-transmission mechanism for automobiles and other quite light vehicles or cars, but may be used for heavier work. Furthermore, its use is not limited to vehicles, but is adapted for general use wherever a variable driving motion or feed movement is required.

In brief, I consider the device broadly new as a mechanical movement and as such desire to claim the same.

What I claim, and desire to secure by Letters Patent of the United States, is as follows:

1. The combination with a driving-shaft, of a rotary obliquely-acting thrust-disk connected thereto for rotation therewith, a non-rotary thrust-ring loosely mounted on said thrust-disk, a driven member and connections for imparting motion from said non-rotary thrust-disk to said driven member.

2. The combination with a driving-shaft, of a rotary thrust-disk pivotally connected to said shaft, for oblique adjustments with respect thereto, a non-rotary thrust-ring loosely mounted on said thrust-disk, a driven member, and connections for imparting motion from said non-rotary thrust-disk to said driven member.

3. The combination with a driving-shaft, of an obliquely-acting thrust-disk connected thereto for rotation therewith, a non-rotary thrust-ring loosely mounted on said rotary thrust-disk, a driven shaft, and connections for imparting motion from said thrust-ring to said driven shaft, involving a friction-clutch.

4. The combination with a driving-shaft and a driven shaft, of a thrust-disk carried by said driving-shaft and connected therewith for oblique adjustments with respect to the axis thereof, means for adjusting said thrust-disk while under motion, a thrust-ring loosely mounted on said thrust-disk, a guide permitting said thrust-ring to wabble but holding the same against rotation, a clutch acting on said driven shaft, and clutch-actuating connections subject to said thrust-ring.

5. The combination with a driving-shaft and a driven shaft having transversely-extended axes, a thrust-disk connected to said driving-shaft by a diametrically-extended pivot, means for adjusting said thrust-disk while under motion, a thrust-ring loosely mounted on said thrust-disk and provided with a pivoted cross-head, a fixed segmental guide in which said cross-head works to hold said thrust-ring against rotation while permitting the same to wabble, a plurality of clutches operating on said driven shaft, and clutch connections attached to said non-rotary thrust-ring at different points circumferentially thereof.

In testimony whereof I affix my signature in presence of two witnesses.

WHITCOMB L. JUDSON.

Witnesses:
JAS. F. WILLIAMSON,
MABEL M. McGRORY.